J. C. WILSON.
MEANS FOR MEASURING ELECTRICAL ENERGY.
APPLICATION FILED MAY 24, 1917.

1,284,846.

Patented Nov. 12, 1918.

Witness
Robert H. Weir

Inventor
John C. Wilson
by Edwin B. H. Tower, Jr.
Atty

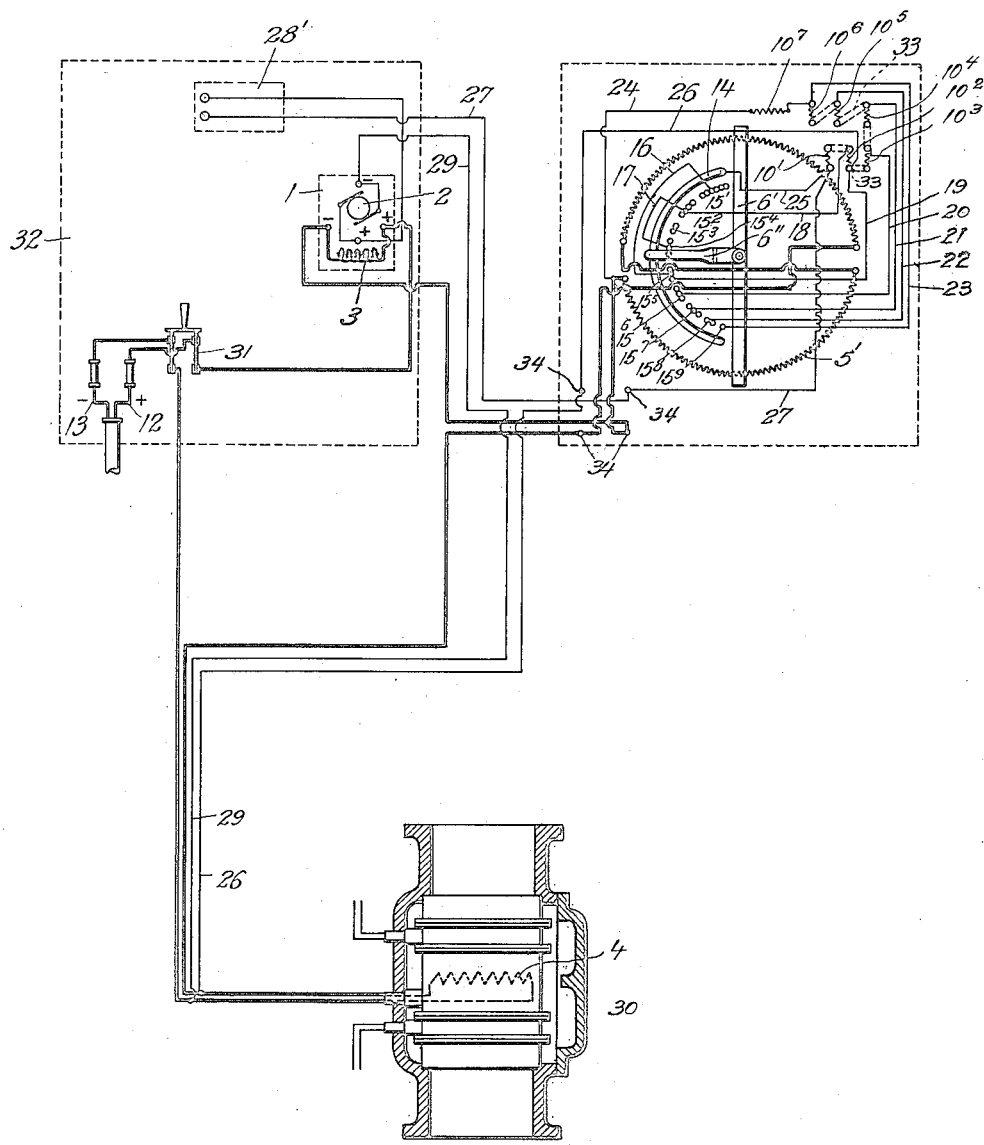

UNITED STATES PATENT OFFICE.

JOHN C. WILSON, OF MILWAUKEE, WISCONSIN, ASSIGNOR TO THE CUTLER-HAMMER MFG. CO., OF MILWAUKEE, WISCONSIN, A CORPORATION OF WISCONSIN.

MEANS FOR MEASURING ELECTRICAL ENERGY.

1,284,846.          Specification of Letters Patent.      Patented Nov. 12, 1918.

Application filed May 24, 1917. Serial No. 170,574.

*To all whom it may concern:*

Be it known that I, JOHN C. WILSON, a citizen of the United States, residing at Milwaukee, in the county of Milwaukee and State of Wisconsin, have invented new and useful Improvements in Means for Measuring Electrical Energy, of which the following is a specification.

This invention relates to means for measuring electrical energy.

This application is a continuation in part of an application Serial No. 784,684, filed August 14, 1913, and which has now eventuated into Patent No. 1,236,130 of August 7,
1917. In said patent there is disclosed but not claimed a system of compensating a wattmeter for loads across which the voltage varies by varying the current in the armature circuit of the wattmeter in accordance with variations in the voltage across the load. Such a system together with its refinements is claimed in the present application.

A wattmeter is sometimes used to measure the energy consumed by a load the voltage across which does not remain constant. Such a condition is met with in a fluid meter of the type disclosed in the patent to C. C. Thomas, 1,222,492, of April 10, 1917, in which a wattmeter is used to measure the energy consumed by the heating coil and in which a rheostat is connected in series with the heater to vary the energy supplied thereto. Where the load is an electric heating coil, such as in a fluid meter, and particularly where a rheostat is operated in series with the coil, the load is varied by varying both the voltage and current. A wattmeter as ordinarily constructed does not operate accurately on varying loads if the voltage is varied and therefore when a wattmeter is used for purposes similar to the above it is desirable to compensate the wattmeter for inaccuracies for the different loads.

The inaccuracies of an ordinary wattmeter when used with loads which are varied by varying the voltage are due to two main things; namely, inability of the usual compensating coil to compensate properly for friction at all loads, and change in the resistance of the voltage circuit due to changes in temperature thereof resulting from the variations in the amount of current passing therethrough.

It is customary to compensate for the friction of the moving parts by using a compensating coil. The compensating coil augments the action of the field coils a sufficient amount to compensate for the friction of the moving parts. If the voltage varies, however, the compensating coil will not properly compensate for friction of the moving parts at all loads. This is due to the fact that the effect of the compensating coil decreases very rapidly as the load decreases because the effect of the compensating coil is about proportional to the product of the current through the armature and the current through the compensating coil. At the lower loads where the friction torque becomes an appreciable percentage of the total torque the compensating torque has decreased to a very low value, because the current in the compensating coil as well as the current in the armature have both decreased, and at low loads the compensating coil will not augment the torque produced by the field coils sufficiently to compensate satisfactorily for friction.

The change in temperature and resistance of the armature circuit is due to the fact that if the load be varied by varying resistance in series therewith, the voltage across the load as well as the current through it will change, thus changing the current through the armature circuit. The change of current in the armature circuit will change the temperature of the different parts comprising such circuit and this change in temperature will result in a change of resistance. Obviously the change of resistance will be followed by a variation in the current flowing through the circuit and hence the armature speed will change.

It will now be seen that a wattmeter as ordinarily constructed will not operate accurately for varying loads when the load is varied by varying the voltage. The wattmeter should be compensated with due regard to the inaccuracies brought about by the effects of varying the load by varying the voltage.

One object of this invention is to provide an improved method of compensating or correcting a wattmeter used for measuring the energy consumed in varying loads.

Another object is to provide means for varying the current in the armature circuit of the wattmeter in accordance with the inaccuracies of the meter at different loads.

Another object is to provide common means for varying a given load and for varying the current through the armature circuit of a wattmeter so that it will properly measure the energy consumed by the varying load.

Another object is to provide a rheostat which has associated therewith complete means for varying the current through the armature circuit of a wattmeter to compensate the wattmeter for varying loads.

The invention is illustrated in the accompanying drawings, in which—

Fig. 4 is a diagrammatic representation of a compensating system as actually used in practice.

Before describing the compensating system, the percentage of error of an ordinary form of wattmeter should be considered for different loads. The two effects described above of varying the load, result in a peculiar operation of the wattmeter as will be seen from the error curve in Fig. 3.

Figure 3:
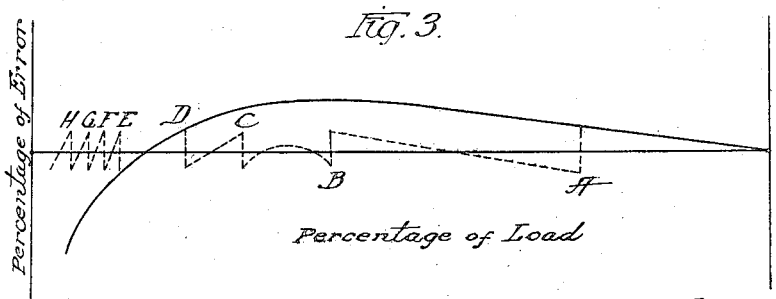
Fig. 3 shows an error curve plotted for the usual wattmeter when used to measure the energy consumed in varying loads, the dotted lines representing the curve after compensation.

In Fig. 3 the abscissa represent the percentage of load up to 100% and the ordinates represent the percentage of error, the base line representing zero error.

At the maximum load the wattmeter magnets may be set so that the wattmeter operates accurately but as the load decreases the wattmeter operates too fast and increase the per cent. of error. This is due to the fact that less current passes through the armature circuit thus reducing its temperature and decreasing its resistance. The armature therefore tends to speed up. This speeding up of the armature continues until the load is decreased to such an extent that the friction overcomes the speeding up effect. The armature will then commence to slow down.

The slowing down of the armature is augmented due to the fact that the compensating effect of the compensating coil is now too small to properly compensate for friction. As the load further decreases the ability of the compensating coil to compensate for friction is reduced further and further until the armature slows down to such an extent that it then begins to operate too slowly. This is the point when the curve crosses the zero error line. Further reduction in load will so weaken the effect of the compensating coil that it will be wholly incapable of compensating for the friction which is now very large in proportion to the total armature torque. The armature therefore slows down very rapidly.

The error curve might also be considered a speed curve because points of the curve above the zero error line indicate that the wattmeter armature is rotating too fast and the points below the zero error line indicate that it is rotating too slowly.

It will now be noted that in order to straighten out the error or speed curve it is necessary to slow down the armature during the first part of the reduction of the load and to speed up the armature during the latter part of the reduction of the load. This may be done by inserting more and more resistance in the armature circuit as the armature tends to speed up and then removing such resistance as it tends to slow down. When the armature tends to rotate too slowly the normal resistance of the armature circuit is reduced more and more to preserve the normal rate of rotation of the armature.

Figure 1:
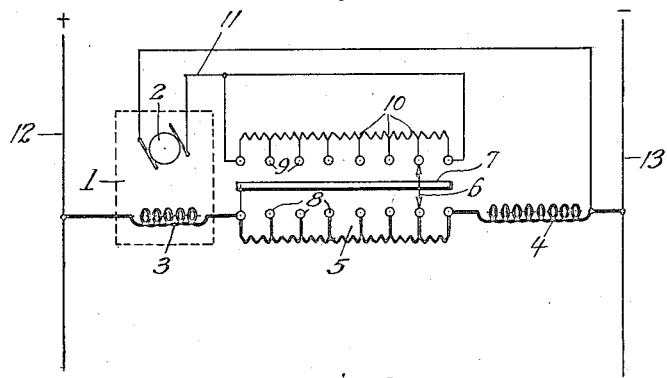
Figure 1 is a diagrammatic view showing a relatively simple layout of the compensating system in order to make clear the principles of operation underlying the same.

Fig. 1 is a diagrammatic representation of a simplified compensating system. The wattmeter to be compensated is shown at 1 and has the usual armature 2 and the field coils 3. The wattmeter is connected to an electric unit 4 which may be assumed to be the heating coil of a fluid meter of the type above referred to. The purpose of the wattmeter is to measure the energy consumed by the heater coil 4. The field coil 3 of the wattmeter is therefore connected in series with the heater coil 4, and the armature circuit of the wattmeter is connected in parallel with the heater coil.

The wattage in the heater coil 4 is varied by means of a rheostat 5, connected in series with the heater coil 4. The rheostat 5 is represented in this view as being of the sliding type in which a rheostat arm 6 slides along a conducting bar 7 and makes contact successively with a plurality of contacts 8 between which the rheostat resistance is connected. It is obvious that as the rheostat arm 6 is moved to the left the rheostat resistance is gradually inserted in the circuit of the heater coil and will decrease the wattage of the heater coil and reduce the load. When the rheostat arm 6 is in the extreme left hand position all of the rheostat resistance is in series with the heater 4 and therefore the wattage through the heater coil will be reduced to a minimum. In this position of the rheostat arm the load is at its minimum value. In the extreme right hand position of the rheostat arm 6 all of the rheostat resistance will be short circuited through the conducting bar 7 and therefore the heater coil 4 will operate at maximum wattage and maximum load.

As the rheostat arm 6 is moved to vary the resistance in circuit with the heating coil 4 it also varies resistance in series with the armature circuit of the wattmeter. For this purpose the rheostat arm 6 is extended to make contact with a second series of contacts 9 between which sections of resistance 10 are connected. Both ends of the resistance 10 are connected by means of a conductor 11 to one brush of the armature 2 as shown in the drawing.

The wattmeter field coil 3, the rheostat 5, and the heater coil 4 are connected across the line, the positive main being shown at 12 and the negative main being shown at 13. As the rheostat arm 6 is moved to the left to decrease the load by inserting resistance in series with the load, resistance is also inserted in the armature circuit of the wattmeter in order to slow down the speed of the armature and thereby straighten out the right-hand portion of the curve shown in Fig. 3. As the arm 6 starts to the left from the right hand end most of the armature current will flow through the section of resistance to the right of the arm but a little will flow the other way. When the arm stands near the center it is hard for current to flow in either direction, but some current flows each way. As the arm approaches the left end the greater part of the current flows through the section of low resistance at the left while only a little flows through the right hand section. Movement of the arm 6 to the left after it reaches its central position therefore serves to remove resistance from the armature circuit to speed up the armature and straighten out the left hand portion of the curve shown in Fig. 3. It will therefore be seen that the speed of the armature of the wattmeter is controlled in accordance with the variations in the load in order to maintain the speed of rotation of the armature substantially proportional to the load.

Figure 2:
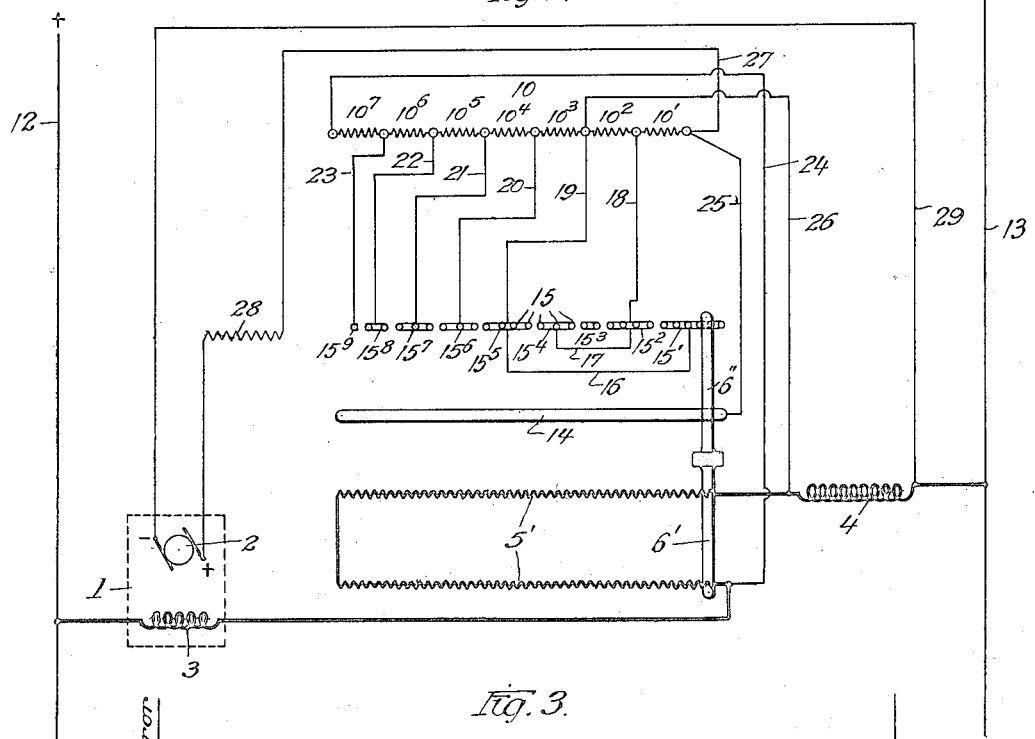
Fig. 2 is a diagrammatic view of a compensating system better adapted for commercial purposes.

In Fig. 2 there is diagrammatically represented a compensating system which is better adapted for commercial purposes. In this view the wattmeter is shown at 1, the armature at 2 and the field coil at 3, these parts being connected in the same manner described above to the rheostat 5'. In this instance also the rheostat arm 6' is moved from its right hand position toward the left to insert the rheostat resistance in the circuit of the heater coil 4. When the rheostat arm 6' is in the position shown in the drawing current will pass from the positive main 12 through the current coil 3, then through the rheostat arm 6' to the heater coil, thus short circuiting the rheostat resistance. In the extreme left hand position of the rheostat arm 6' the current is forced to flow through the resistance of the rheostat.

The upper end 6'' of the rheostat arm 6' is insulated from the lower part and makes contact with a conducting bar 14. It also makes contact with series of contacts 15. These contacts are connected with the rheostat resistance 10 for the armature circuit in a certain manner now to be described so that as the rheostat arm 6' is moved to the left to decrease the load it varies the amount of resistance 10 in circuit with the wattmeter armature in such a manner as to straighten out the curve shown in Fig. 3 and maintain the speed of the armature substantially proportional to the load.

The contacts 15 are divided into a plurality of groups, $15^1$ to $15^9$, and the different contacts of each group constitute, in effect, a single contact. The rheostat resistance 10 is divided into a plurality of sections, $10^1$ to $10^7$. The electrical connections between the contacts 15 and the sections of the resistance are as follows:—The first group of contacts $15^1$ is connected with the group of contacts $15^5$ by means of the conductor 16. The second group of contacts $15^2$ is connected to the fourth group of contacts $15^4$ by means of the conductor 17. The second group of contacts $15^2$ is connected by means of the conductor 18 between the resistance sections $10^1$ and $10^2$. The third group of contacts $15^3$ are blank contacts and are not electrically connected with any of the other contacts or any of the resistance sections. The group of contacts $15^5$ in addition to being connected with the group of contacts $15^1$ is electrically connected by means of the conductor 19 between the resistance sections $10^2$ and $10^3$. The group of contacts $15^6$ is connected by means of the conductor 20 between the resistance sections $10^3$ and $10^4$. The group of contacts $15^7$ is connected by means of the conductor 21 between the resistance sections $10^4$ and $10^5$. The group of contacts $15^8$ is connected by means of conductor 22 between resistance sections $10^5$ and $10^6$, and the contact $15^9$ is connected between the resistance sections $10^6$ and $10^7$ by conductor 23. The left side of the resistance $10^7$ is connected by means of the conductor 24 to the right side of the rheostat 5'. The right side of the resistance 10 is connected by means of conductor 25 to the conducting bar 14. A conductor 26 connects the left side of the heating coil 4 to a point between the resistance sections $10^2$ and $10^3$. The resistance 10 made up of the resistance sections $10^1$ to $10^7$ is connected in series with the armature of the wattmeter by means of a conductor 27. The usual multiplier resistance 28 of the wattmeter is inserted in the circuit. The right side of the heating coil 4 is connected to the wattmeter armature 2 by means of a conductor 29.

The purpose of electrically connecting the parts in the above described manner will be apparent from the following description of the operation of the system.

When the rheostat arm 6' is in its extreme right hand position the resistance of the rheostat 5' is short circuited and therefore the heating coil 4 operates at maximum wattage. The path of the current to the wattmeter armature is then as follows: From the left side of the heating coil 4 through the conductors 26 and 19, group of contacts $15^5$, conductor 16, group of contacts $15^1$, the upper portion 6'' of the rheostat arm, bar 14, conductors 25 and 27, through the armature 2 and then through the conductor 29 to the right side of the heating coil 4. In this position of the rheostat arm 6' the current to the wattmeter armature does not pass through any of the resistance 10.

When the extension 6'' of the rheostat arm reaches the contacts $15^2$ the current to the wattmeter armature flows through conductor 26 then through resistance section $10^2$, conductor 18, group of contacts $15^2$, the upper portion 6'' of the rheostat arm, bar 14, conductors 25 and 27, and then through the wattmeter armature. The current to the wattmeter armature is therefore caused to pass through the resistance section $10^2$. This will have the effect of slowing down the speed of the armature and will "pull down" the error curve to the point marked A in Fig. 3.

When the arm 6'' reaches the group of contacts $15^3$ the only path which the current can take to reach the armature of the wattmeter is through the conductor 26, resistance section $10^2$, resistance section $10^1$ and then through the armature by the conductor 27. The current therefore passes through both resistance sections $10^1$ and $10^2$ and this will have the effect of slowing down the wattmeter armature and pulling down the error curve to the point marked B in Fig. 3.

When the arm 6'' reaches the group of contacts $15^4$ current passes to the wattmeter armature through the conductor 26, resistance section $10^2$, conductor 18, group of contacts $15^2$, conductor 17, group of contacts $15^4$, the arm 6'', bar 14, conductors 25 and 27 to the wattmeter armature. This step therefore removes the resistance section $10^1$ and the current passes only through the resistance section $10^2$. This step takes place just after the error curve starts to drop and as the armature is speeded up the error curve is pulled up to the point C. The next movement of the arm 6'' also removes the resistance section $10^2$. The rheostat arm will then be in engagement with the group of contacts $15^5$ and the path of the current to the armature is as follows: Through conductor 26, conductor 19, group of contacts $15^5$, arm 6'', bar 14, and conductors 25 and 27 to the wattmeter armature. The removal of the resistance section $10^2$ pulls up the compensated curve to the point D which it will be noted lies on the non-compensated curve. This is due to the fact that at this position of the rheostat arm 6' the current to the armature does not flow through any of the resistance sections and therefore the wattmeter is not compensated. It is therefore natural that the point D should lie on the normal error curve of the wattmeter.

It should here be noted that there is always a complete path for the current from conductor 24 through resistance sections $10^7$ to $10^1$ and then to the wattmeter armature through conductor 27. However the relative resistance of this path is so high that very little current flows through it while the arm 6'' is near its extreme right hand position. The current through this path increases as the arm 6'' is moved to the left and continues to increase until it becomes the controlling factor in determining the speed of the wattmeter armature.

When the arm 6'' leaves the contacts $15^5$ and comes into engagement with the group of contacts $15^6$ the resistance section $10^3$ will be cut out thus increasing the amount of current passing through section $10^7$. The current will then pass to the armature through the conductor 24, resistance sections $10^7$, $10^6$, $10^5$ and $10^4$, conductor 20, group of contacts $15^6$, arm 6'', bar 14 and conductors 25 and 27 to the armature. This increase in the current through $10^7$ pulls up the error curve to the point E because it increases the speed of the wattmeter armature.

Movement of the arm 6'' to the group of contacts $15^7$ cuts out resistance section $10^4$ and the current will then pass from the conductor 24 through the resistance sections $10^7$, $10^6$, $10^5$, conductor 21, group of contacts $15^7$, arm 6'', bar 14 and conductors 25 and 27 to the wattmeter armature. This will pull up the error curve to the point F.

Likewise, movement of the arm 6'' to the group of contacts $15^8$ will cut out the resistance $10^5$ to pull up the error curve to the point G and movement of the rheostat arm to the contact $15^9$ will cut out the resistance section $10^6$ to pull up the error curve to the point H. The resistance $10^7$ is never cut out.

The different circuits have been traced for a complete movement of the rheostat arm from the extreme right hand position to the extreme left hand position which corresponds with a decrease of the load from the maximum value to its minimum value. However, it is to be understood that rheostat arm 6' may be moved to any position to properly vary the load and that the resistance sections $10^1$ to $10^7$ are inserted in, or removed from the armature circuit accordingly.

It will now be obvious that the effect of inserting and removing the resistance sections $10^1$ to $10^7$ is to correct the error curve as indicated by dotted lines in Fig. 3 so that the zero error line passes subtsantially midway between the high and low points of the corrected curve.

In Fig. 4 there is diagrammatically shown the apparatus as it is actually made in practice.

The fluid meter of which the heating coil 4 forms a part is denoted generally by 30. It may be of the type shown in the above mentioned application of C. C. Thomas and need not be herein described as the present invention deals only with the heating coil 4 associated therewith. It might here be stated, however, that the energy supplied to the heating coil 4 is varied so as to maintain a constant temperature rise of the fluid passing through the meter. This regulation may be effected manually or automatically. It is the function of the rheostat 5' to control the energy supplied to the heating coil 4 and in practice this rheostat is operated automatically. However, so far as the present invention is concerned it is immaterial how the rheostat is operated and therefore no automatic means are shown to operate the same.

The wattmeter 1, the multiplier box 28', the main switch 31, and various other instrumentalities are placed upon an instrument board 32. The instruments shown upon board 32 are only those which are necessary in the explanation of the present invention. This board in practice contains various other instruments which are necessary for the metering operation.

The rheostat 5' is located at a suitable point with respect to the other parts of the system and in practice is usually of the circular split type as shown. The same reference characters have been used in Fig. 4, so far as possible, as are used in Fig. 2 so as to show the analogy between the various parts of the system. It will be noted that the arm 6' in Fig. 4 corresponds with the rheostat arm 6' in Fig. 2 and varies the resistance of the rheostat. The conducting bar 14 of Fig. 2 is in the case of Fig. 4 made semi-circular and the contacts 15 are arranged in semi-circular series. The contacts 15 of Fig. 4 are divided into groups in identically the same manner as in Fig. 2 and some are electrically connected to each other, and all are electrically connected with the resistance sections in the same manner as shown in Fig. 2. In this instance the resistance sections $10^1$ to $10^7$ are in the nature of separate units. Certain of these resistance units are connected by conducting strips 33 which permit the current to pass from one resistance unit to the other when conditions are such that the current should pass from one to the other.

The arm 6'' is disposed substantially at right angles to the arm 6' and performs the function of the upper portion 6'' of the arm 6' in Fig. 2. In other words, it establishes a connection between the contacts 15 and the conducting bar 14.

The various conductors of the rheostat are brought to suitable terminals 34 to which the conductors from the other part of the system may also be connected.

All of the conductors in Fig. 4 have the same reference characters as the corresponding reference characters in Fig. 2 and therefore the circuits of Fig. 4 may be readily followed. However, to make the analogy between Fig. 4 and Fig. 2 clear several of these circuits will be traced.

When the arm 6'' is in the position shown in Fig. 4 current passes through the conductor 26, through the resistance unit $10^2$ and through the conductor 18, group of contacts $15^2$, conductor 17, group of contacts $15^4$, arm 6'', conducting bar 14, conductors 25 and 27, multiplier box 28', then through the wattmeter armature 2 and back through the conductor 29 to one of the leads from the heating coil 4. This path of the current is identical with the path described above in connection with Fig. 2 when the arm 6'' is in engagement with the group of contacts $15^4$. When the arm 6' of Fig. 4 is in such a position that all of the rheostat resistance is cut out and the heating coil is operating at maximum load the arm 6'' will engage with the group of contacts $15^1$. In this position of the arm current will pass to the wattmeter armature through the conductor 26, then through conductor 19, to group of contacts $15^5$, through conductor 16, to group of contacts $15^1$, then to the conducting bar 14, through the arm 6'', thence through conductors 25 and 27, through the wattmeter armature.

It will now be seen that the electrical connections are identically the same in Fig. 4 as in Fig. 2 and as the reference characters are applied to corresponding conductors in both views it is believed to be unnecessary to trace all of the circuits in Fig. 4.

Fig. 4 shows apparatus as it is actually constructed in practice for use in a fluid metering system but it will be understood that the invention is in no way limited to such a system. The present compensating system is applicable to all wattmeters when used to measure the energy consumed in a load which is varied by varying the voltage across a fixed resistance, and it is immaterial whether this resistance is the heating coil of a fluid meter or any other electrical unit.

Furthermore, various changes may be made in the number, the resistance values, grouping, and the time of cutting in and out the various resistance units to meet practical conditions. In other words, a wattmeter may not have exactly the same error curve as shown in Fig. 3 although this curve is plotted from a standard wattmeter. Under such conditions the resistance units should be so arranged and so cut in and out of circuit that the error curve will be corrected in the proper manner.

The contacts 15 are so grouped that the rheostat arm will have to move a predetermined distance before a certain resistance section is cut in or out. This is to produce a correction of the error curve at a predetermined value of the load. The points A and B are relatively far apart and therefore the rheostat arm should move a relatively long distance before correction is produced in the error curve at these points. Toward the left hand end of the error curve frequent correction is necessary on account of sudden drop of the curve and therefore the contacts 15 at the left side of the rheostat are arranged in small groups. Therefore during the movement of the rheostat arm at this side of the rheostat, correction of the error curve will be produced more frequently. This grouping of the contacts, however, will depend wholly upon the characteristic of the error curve and of the rheostat 5'.

It will now be seen that the wattmeter compensating system herein described is a thoroughly practical one and approximately compensates the wattmeter for all loads ranging from maximum load to minimum load. The mechanism for compensating the wattmeter is self contained and is wholly external of the wattmeter. Any wattmeter may therefore be compensated without any alteration or change thereof. The rheostat may have associated therewith complete means for compensating the wattmeter and it is only necessary to make the proper electrical connections between the parts of the rheostat and the wattmeter.

Although it is desirable to make the compensating resistance a component part of the rheostat for the load, yet in some instances it may be desirable to make the compensating resistance independent of the load rheostat and to provide some means other than that herein described for varying the compensating resistance in accordance with changes in the load. Therefore I do not wish to limit myself to a construction in which these parts are combined.

Although some of the drawings diagrammatically represent apparatus as actually used in practice it is to be understood that other forms of apparatus may be employed and therefore the invention is not limited to the specific forms herein described.

What I claim is:

1. The method of compensating a wattmeter which is used to measure the energy consumption of a load in series with a means for varying the energy supply thereto, which consists in varying the resistance of the voltage circuit of the wattmeter in accordance with variations in the energy supply to said load.

2. The method of compensating a wattmeter which is used to measure the energy consumption of a load the voltage across which varies, which consists in varying the resistance of the voltage circuit of the wattmeter in accordance with the variations in the voltage across the load.

3. The method of compensating a wattmeter which is used to measure the energy consumption of a load the voltage across which varies, which consists in varying the current in the potential circuit of the wattmeter in such a way as to compensate for the variations in the voltage across the load.

4. The method of compensating a wattmeter which is used to measure the energy consumption of a load the voltage across which varies, which consists in inserting resistance in and removing the same from the voltage circuit of the wattmeter in accordance with the variations in the voltage across the load.

5. The combination with an integrating wattmeter connected to an electric circuit having a load connected therein the voltage across which varies, of means for varying the current in the potential circuit of the wattmeter for compensating the wattmeter for variations in the voltage across the load.

6. The combination with an integrating wattmeter for measuring the consumption of a load the voltage across which varies, of a resistance connected in the voltage circuit of the wattmeter and means for varying said resistance to compensate the wattmeter for the variations in the voltage across the load.

7. The combination with an integrating wattmeter for measuring the consumption of a load the voltage across which varies, of means for successively inserting resistance in the voltage circuit of the wattmeter and removing resistance therefrom as the voltage across the load is decreased from its maximum to its minimum.

8. The combination with a wattmeter for measuring the energy consumption of a load of a rheostat for varying the voltage across said load and means associated with the rheostat for varying the current in the voltage circuit of the wattmeter as the rheostat resistance is varied.

9. The combination with a wattmeter for measuring the energy consumption of a load, of a rheostat for varying the voltage across said load said rheostat having two banks of resistance, one bank being connected in series with the load and the other being connected in the voltage circuit of the wattmeter, and means to vary the resistance in series with the load, said means being adapted to vary in a predetermined manner the resistance connected in the voltage circuit of the wattmeter.

10. A rheostat for use in varying a load and for compensating a wattmeter in accordance with the variations in the load comprising one bank of resistance adapted to be connected in series with the load, means to vary said resistance, another bank of resistance adapted to be connected in the voltage circuit of the wattmeter, and means for varying the amount of resistance in said second bank in a predetermined manner as the resistance in the first bank is varied, the variation of the resistance in said second bank being dissimilar to the variation of the resistance in the first bank.

11. A rheostat for use in varying a load and for compensating a wattmeter in accordance with the variations in the load comprising a bank of resistance adapted to be connected in series with the load, means for varying said bank of resistance, and a plurality of resistance units adapted to be coupled and uncoupled in a predetermined manner as the resistance of said bank is varied, the variation of the total resistance of said units being dissimilar to the variation of the resistance of said bank.

In witness whereof, I have hereunto subscribed my name.

JOHN C. WILSON.